(No Model.) 2 Sheets—Sheet 1.
C. A. KETCHAM.
PEA HULLER.

No. 581,073. Patented Apr. 20, 1897.

Witnesses
Jas. K. McCathran
V. B. Hillyard.

By his Attorneys, Charles A. Ketcham
C. A. Snow & Co.

THE NORRIS PETERS CO., PHOTO-LITHO., WASHINGTON, D. C.

(No Model.) 2 Sheets—Sheet 2.
C. A. KETCHAM.
PEA HULLER.
No. 581,073. Patented Apr. 20, 1897.
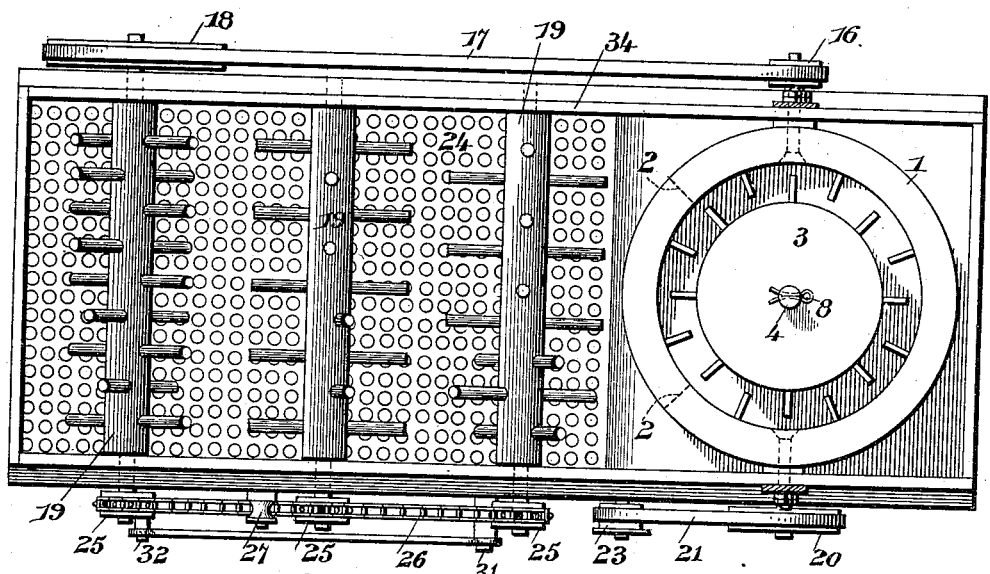
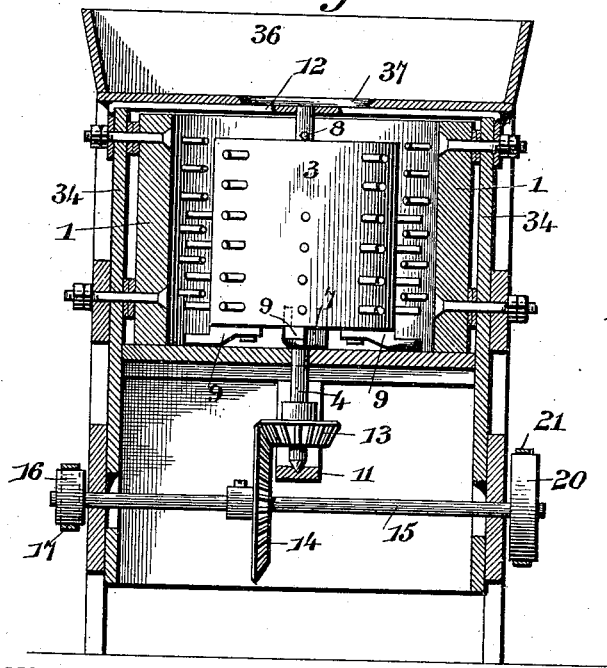
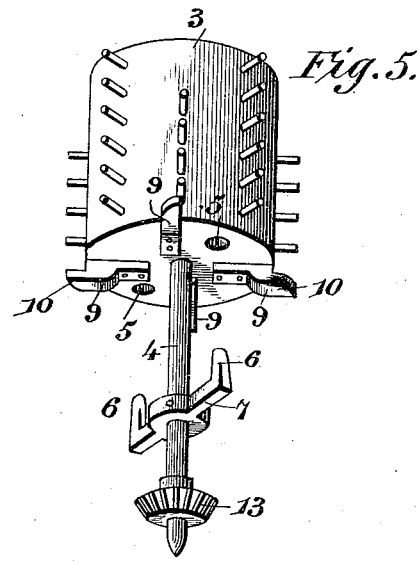
Witnesses
Jas. K. McLathran
V. B. Hillyard
Inventor
Charles A. Ketcham
By his Attorneys,
C. A. Snow & Co.

UNITED STATES PATENT OFFICE.

CHARLES A. KETCHAM, OF PILLOWVILLE, TENNESSEE.

PEA-HULLER.

SPECIFICATION forming part of Letters Patent No. 581,073, dated April 20, 1897.

Application filed July 29, 1896. Serial No. 600,935. (No model.)

*To all whom it may concern:*

Be it known that I, CHARLES A. KETCHAM, a citizen of the United States, residing at Pillowville, in the county of Weakley and State of Tennessee, have invented a new and useful Pea-Huller, of which the following is a specification.

This invention relates to machinery for hulling or stripping peas and separating the same from the pods and other foreign matter and delivering them in a marketable form.

The purpose of the invention is to devise a machine which will perform the work of hulling and separating the peas in a thorough and effective manner and in a comparatively short space of time and without breaking, bruising, or otherwise injuring the marketable product.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
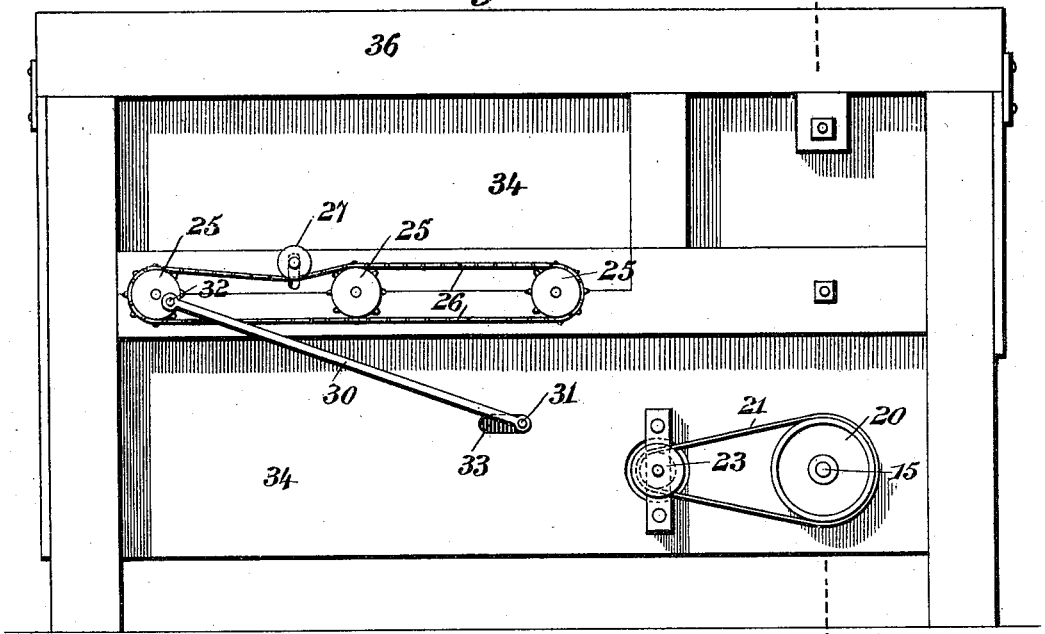
Figure 3:
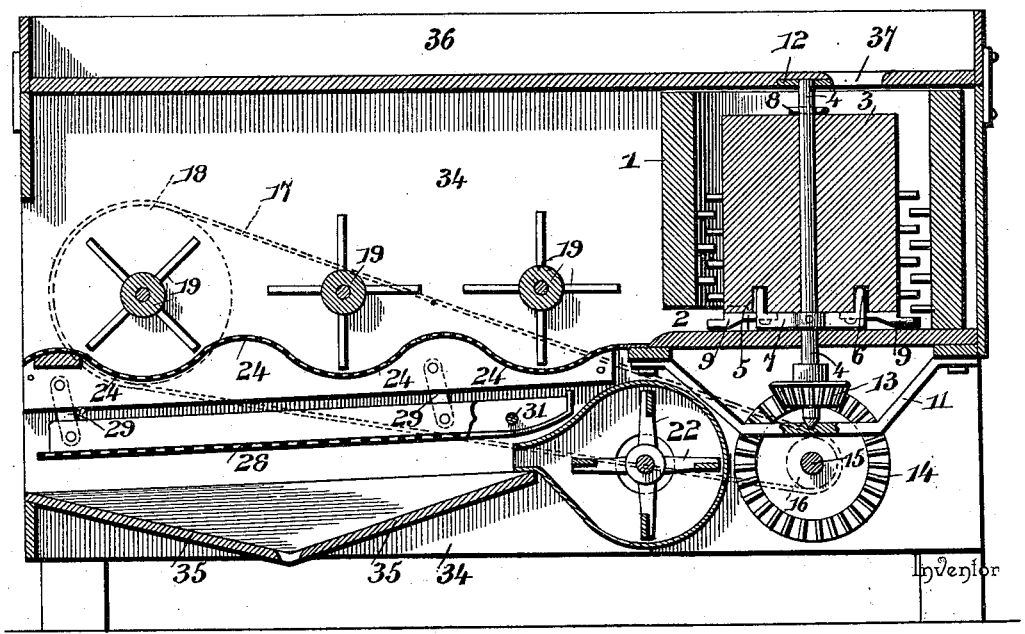

Figure 1 is a side elevation of a pea huller and separator for effecting the ends of this invention. Fig. 2 is a top plan view thereof with the hopper removed. Fig. 3 is a vertical central longitudinal section of the complete machine. Fig. 4 is a transverse section on the line X X of Fig. 1, looking in the direction of the arrow. Fig. 5 is a detail view of the drum or cylinder, showing the manner of detachably connecting it with the driving-shaft.

Corresponding and like parts are referred to in the following description and indicated in the several views of the accompanying drawings by the same reference-characters.

The framework of the machine, as shown, is a box-like structure of rectangular form, although in practice it may assume any desired appearance according to the style and character of the machine. The discharge end of the frame is open for the egress of the broken pods, hulls, vines, &c. A shell or casing 1, of cylindrical outline, is located at the receiving end of the machine and is vertically disposed and is toothed on its inner side and forms part of the hulling or stripping mechanism. The lower portion of the shell or casing is removed to provide a discharge-opening 2 for the escape of the broken pods and peas from the hulling mechanism into the stripping mechanism.

A toothed cylinder or drum 3 is located within the shell or casing and acts jointly therewith to thresh, strip, or hull the peas. This cylinder or drum is removably mounted upon a vertical shaft 4 and is caused to revolve with the latter when in operative relation by having openings 5 formed in its lower end to receive vertical extensions 6 of a cross-bar 7, secured to the lower end of the shaft 4, said cross-bar forming a support for the cylinder or drum when the latter is mounted thereon. A pin or key 8 passes through an opening in the upper end of the shaft 4 and retains the drum or cylinder in working position thereon.

A series of arms 9 are secured to the lower end of the cylinder or drum and are adapted to operate over the bottom of the shell or casing 1, so as to forcibly eject the peas and broken pods or hulls from the hulling mechanism through the discharge-opening 2, and these arms are enlarged near their outer ends and are provided with terminals 10, which are beveled on their advancing sides, so as to force the material against the inner wall of the shell or casing and out through the discharge-opening 2. These terminal portions 10 project beyond the peripheral surface of the cylinder or drum a distance corresponding to the length of the teeth and in addition to being beveled are rearwardly curved, so as the better to effect a discharge of the material from the stripping mechanism.

The shaft 4 is vertically journaled, being stepped at its lower end in a longitudinal bar 11 and journaled at its upper end in a transverse bar 12, and is provided at its lower end with a bevel-pinion 13, which meshes with a corresponding bevel gear-wheel 14, mounted upon a transverse shaft 15, which is driven by hand or from any suitable source of power. A band-pulley 16 is provided at one end of the transverse shaft 15 and receives a belt 17, which passes around a band-pulley 18 on a journal of the terminal reel or toothed roller 19. A band-pulley 20 is mounted upon the opposite end of the shaft 15 and receives the belt 21, by means of which motion is transmitted to the fan 22, the shaft of the latter being extended and having a pulley 23 to receive the said belt 21.

A connected series of troughs 24 are disposed in horizontal relation and extend transversely of the machine in parallelism and are formed by a perforate plate which is depressed at intervals in its length, so as to form the said troughs, the depressions or troughs being approximately semicircular in cross-section. The openings or perforations in the plate comprising the troughs are sufficiently large to admit of the passage therethrough of the largest-sized peas, and this provision is essential to the successful operation of the machine.

A series of reels or toothed rollers 19 are provided to coöperate with the troughs 24, one being had for each trough, and the teeth of the reels or rollers are constructed to sweep over the troughs, so as to agitate, loosen, and urge forward the peas and hulls, &c. A journal of the reels or toothed rollers is extended beyond a side of the machine and is provided with a sprocket-pinion 25, and these sprocket-pinions are connected in series by a sprocket-chain 26, so as to cause the series of reels or toothed rollers to operate in unison. A roller 27 is provided and engages with a portion of the sprocket-chain to maintain the latter in engagement with the intermediate sprocket-pinion and preserve a proper tension upon the sprocket-chain, so as to insure the successful operation of the machine.

A vibrating shoe or screen 28 is located below the troughs 24 and is supported by hangers 29 and is oscillated by means of a pitman 30, which connects an arm 31, secured at its inner end to the shoe or screen 28, with a wrist-pin 32, provided on the sprocket-pinion of the terminal reel or toothed roller. The arm 31 operates in a slot 33 in a side of the frame or structure 34. The front or receiving end of the shoe or screen is curved upwardly, so as to prevent the peas, broken hulls, &c., from passing thereover. Oppositely-inclined boards 35 are located below the shoe or screen and form the bottom of the frame or structure 34, and the adjacent ends of these boards are spaced apart, forming a discharge-opening for the escape of the marketable product into a receptacle suitably placed for its reception. The fan 22 is located at the receiving end of the shoe or screen and is adapted to deliver a strong blast of air over the boards 35 and through the space formed between the latter and the shoe or screen, so as to carry off small particles, thereby removing the last traces of foreign matter remaining after the peas have passed through the shoe or separating-screen.

A hopper 36 closes the upper end of the frame or structure 34 and is provided in its bottom with an opening 37, through which the whole peas pass into the hulling or stripping mechanism, any suitable means being provided to move the peas on the hopper toward the opening 37, and this operation is generally performed by hand. As the peas enter the shell or casing 1 they are hulled or stripped, and when threshed are delivered to the first of the series of troughs 24 and are moved through the successive troughs by means of the reels or toothed rollers, so as to remove the peas from the vines, broken pods, &c., the latter passing over the last trough of the series and dropping upon the ground or into a receptacle placed for their reception. The peas after passing through the troughs are received upon the shoe or separating-screen, which latter serves to remove such pieces of hulls and vines which may have passed through the openings of the troughs, and such matter as is removed by the shoe escapes at the rear end of the machine, and the peas, dropping through the space between the shoe or screen and the boards 35, are subjected to the blast of air which carries off the smaller particles which may have passed through the shoe, thereby reducing the product to a marketable form.

When it is required to gain access to the hulling or threshing mechanism for any required purpose, the hopper is removed and the bar 12 detached, and upon withdrawing the pin 8 the toothed cylinder or drum 3 can be lifted from the shell 1. The cross-bar 7, being secured to the shaft 4 and engaging with the upper face of the bottom, acts jointly with the bar 11 to retain the shaft 4 in proper position. When the machine is in operation, the cross-bar 7 prevents the peas from collecting in the space formed between the lower end of the cylinder and the bottom, and in this respect supplements the action of the arms 9 to move the peas outward, as will be readily understood.

Having thus described the invention, what is claimed as new is—

1. In combination, an upright shell or casing internally toothed and closed at its lower end by a bottom, and having a discharge-opening in its side immediately above the plane of the bottom, a vertical shaft concentric with the casing and having its lower end projecting through its bottom, a bar 11 forming a support for the lower end of the shaft, a bar 7 having bent ends and secured to the shaft immediately above the bottom, and acting jointly with the bar 11 to retain the shaft in position, a drum externally toothed and removably fitted upon the shaft, and having openings in its lower end to receive the bent ends of the rod 7, and arms secured to the lower end of the drum and having their ends extending to sweep the peas through the side discharge-opening, substantially as described.

2. In combination, an internally-toothed casing vertically disposed, closed at its lower end, and having a discharge-opening in its side immediately above the plane of the bottom, a removable hopper closing the upper end of the casing, a vertically-disposed shaft concentric with the casing and having its lower portion projecting through the bottom, bars 11 and 12 forming bearings for the ends of the shaft, actuating mechanism applied to the shaft below the bottom of the casing, a bar 7 having vertical extensions secured to the shaft immediately above the bottom of the casing and acting jointly with the bar 11 to retain the shaft in place when the bar 12 is removed, an externally-toothed drum removably fitted upon the shaft and having openings in its lower end to receive the vertical extensions of the bar 7, means for securing the drum upon its shaft, and arms secured to the lower end of the drum and projecting beyond the sides thereof, and having their projecting portions curving and beveled rearwardly, substantially as set forth for the purpose described.

3. The herein-described pea huller and separator, comprising a box-framework, an internally-toothed casing vertically disposed at one end of the framework, and having an opening in its inner side immediately above the bottom, a hopper removably fitted to the upper end of the framework, a vertical shaft extending through the bottom of the casing, actuating mechanism applied to the lower end of the said shaft, a bar secured to the shaft and having its ends bent vertically and operating immediately over the bottom of the casing, a toothed drum removably fitted upon the vertical shaft and having openings in its lower end to receive the bent terminals of the aforesaid bar, arms secured to the lower end of the drum and coöperating with the bar to move the matter outward, a connected series of perforate troughs horizontally disposed and communicating with the casing, a series of toothed rollers coöperating with the troughs, a shoe disposed immediately below the troughs, oppositely-inclined deflecting-boards below the shoe for receiving and collecting the peas, and a fan arranged to deliver a blast into the space between the shoe and deflecting-boards, substantially as set forth.

In testimony that I claim the foregoing as my own I have hereto affixed my signature in the presence of two witnesses.

C. A. KETCHAM.

Witnesses:
  O. M. WRINKLE,
  N. B. MOORE.